United States Patent [19]

Stirling

[11] 4,266,966

[45] May 12, 1981

[54] DUST TREATMENT

[76] Inventor: Harold T. Stirling, 39 Hoodridge Dr., Mount Lebanon, Pa. 15228

[21] Appl. No.: 24,658

[22] Filed: Mar. 28, 1979

[51] Int. Cl.³ .......................... C21B 1/04; C22B 7/02
[52] U.S. Cl. .............................................. 75/25; 75/5
[58] Field of Search ........................ 75/3–5, 75/25, 34–37

[56] References Cited

U.S. PATENT DOCUMENTS

| | | | |
|---|---|---|---|
| 3,313,617 | 4/1967 | Ban et al. | 75/5 |
| 3,332,770 | 7/1967 | Wendt, Jr. et al. | 75/5 |
| 3,365,339 | 11/1968 | Beggs et al. | 75/5 |
| 3,374,085 | 3/1968 | Stone | 75/3 |
| 3,482,964 | 12/1969 | Ishimitsu et al. | 75/3 |

FOREIGN PATENT DOCUMENTS 51-20368  6/1976  Japan ............................................. 75/4

*Primary Examiner*—Michael L. Lewis
*Attorney, Agent, or Firm*—Ronald S. Cornell

[57] ABSTRACT

Steelmaking dust is refined by pelletizing the dust and heating the pellets with a reducing agent at a rate sufficient to explode a significant number of pellets.

8 Claims, No Drawings

DUST TREATMENT

This invention relates to the treatment of dust from refining processes, and more particularly to the treatment of dust removed from a steelmaking furnace for the purpose of removing zinc and other impurities and converting the dust into a form suitable for recycling to the steelmaking operation.

In refining operations such as steelmaking by the basic oxygen process various impurities are removed, and some, such as zinc, are collected as part of the dust that is formed during the operation.

The collected dust contains a high percentage of iron and thus would be a valuable asset were it not for the presence of relatively high amounts of objectionable impurities such as zinc and lead. Attempts have been made in the past to remove these impurities from basic oxygen and other dusts, but these attempts have been unsuccessful for a variety of reasons.

The principal methods proposed heretofore have involved an attempt to pelletize the dust and thereafter to reduce the impurities such as zinc at temperatures sufficient to volatilize the metal. Such attempts followed standard pelletizing techniques in which the dust was wetted and pelletized either alone or in admixture with carbonaceous fuel, the pellets were screened to obtain a desired size, the sized pellets carefully dried, and the temperature gradually raised to heat harden the pellets and to drive off impurities. In practice, these attempts have generally not been successful because the pellets have been too weak to withstand handling and the processing requirements were too restrictive. For example, cooling in the absence of oxygen was required by one proposal. In some instances strong pellets were formed, but these lacked sufficient permeability, making the pellets so difficult to dry that these attempts were also abandoned.

I have now discovered a simple process by which zinc and other impurities can be removed from basic oxygen and other furnace dusts. This process takes advantage of factors that have been considered in the past to be disadvantageous. In brief, the present invention forms wet pellets from basic oxygen dust. Then, instead of carefully drying the pellets as in the past, these wet pellets are immediately subjected in the presence of a carbonaceous material to temperatures sufficient to deliberately explode the pellets due to the volatilization of the water and the impurities. The explosion of the pellets increases the surface area and significantly enhances the removal of impurities. The purified material can then be water quenched and recycled to a blast furnace, basic oxygen process, or the like. This process is not only simpler than previously attempted similar process, but it also enables a reduction in processing time from the approximately two hours or more required by earlier attempts to as little as 30 to 45 minutes, or even less.

Pursuant to the present invention, many conventional steps have been eliminated from standard pelletizing procedure. Among these are the aforementioned drying steps which requires slowly heating the wet pellets, sizing the pellets, and addition to the feed dust of additives intended to increase strength and/or permeability.

EXAMPLE I

A feed material which comprises a particulate powder collected during a basic oxygen steelmaking process admixed with sufficient coke breeze to provide 30 percent carbon in the mixture is fed to a pelletizing drum where sufficient water is added to cause pellets to form. The pellets contain about 4.5% water. Chemical analyses of the basic oxygen powder and of the coke breeze for the significant constituents are as follows:

| Basic Oxygen Powder | | Coke Breeze | |
| --- | --- | --- | --- |
| Constituent | Parts by weight | Constituent | Parts by weight |
| ZnO | 6.2 | ZnO | 0.1 |
| PbO | 0.7 | PbO | trace |
| Fe$_T$ | 43 | Fe$_T$ | trace |
| FeO | 19.5 | Carbon | 80 |
| Carbon | 0.8 | | |

No attempt is made to control the pellet size or to dry the pellets prior to their introduction into a preheated rotary kiln that is maintained as closely as possible to 2100° F. The kiln is lined with refractory material capable of withstanding at least 2700° F. so that, in the event of ringing, the temperature can be raised sufficiently to melt the material to the flow point to eliminate the ringing. The feed into the kiln is continuous and the average particles residence time in the kiln is 35 minutes.

The larger pellets and many of the smaller ones, explode when heat treated and white smoke, representing the volatile impurities, is removed and collected. The product removed from the kiln is in a physical form similar to sintered material and has a chemical analysis as follows:

| Constituents | Parts by Weight |
| --- | --- |
| ZnO | 0.4 |
| PbO | 0.04 |
| Fe$_T$ | 55 |
| FeO | 45 |
| Carbon | 15 |

It will be seen that, expressed as a percent of total iron the ZnO content has been reduced from 14.4 percent to 0.7 percent which is equivalent to about 95 percent removal.

EXAMPLE II

The process of Example I is repeated with the difference that the pellets are formed without adding coke breeze and the formed pellets are thereafter admixed with coke breeze just prior to introduction of the mixture into the kiln. The temperature is maintained as close as possible to 2050° F., average residence time is 45 minutes and the results are similar to those of Example I except that about 98.5 percent of the zinc is removed.

EXAMPLES III–VI

Similar runs to Example II are made using particulate coal, coke, oil, and coke oven gas as fuel instead of coke breeze with similar results.

EXAMPLES VII–IX

The process of Example II is repeated using the temperatures of 1900° F., 2000° F. and 2150° F. for periods of 45, 35, and 27 minutes average residence time respectively with satisfactory results.

The product produced by the disclosed process is preferably water-quenched upon removal from the kiln.

This substantially zinc-free material is primarily a sinter like product having a size between eight mesh and ¼ inch and is in a form suitable for direct addition to a steelmaking process.

Various modifications in the process may be made without departing from the spirit and scope of the invention. For example, it is contemplated that the temperature can be maintained between about 1900° and 2200° F. preferably between 1950° and 2125° F., and most preferably between 2050° and 2100° F. Also, the quantity of carbonaceous material added may be that quantity which will provide from about 20% to 40% of carbon or its equivalent, preferably 25–35%. It has been found that the use of randomly sized pellets which are heated to the described temperatures will generally result in at least 10% and preferably at least 25% of the pellets exploding.

What is claimed is:

1. A process for converting waste dust from a refining process into valuable material suitable for recycling to a refining process comprising the steps of pelletizing said dust, heating the resulting pelletized dust in the presence of a material capable of reducing oxides without intermediate significant drying to a temperature between about 1900° and 2200° F. and at a rate sufficient to explode at least 10 percent of said pellets and thereby remove volatile impurities, and removing the resulting material from said chamber.

2. The process of claim 1 wherein the resulting sinter material is water quenched after removal from said chamber.

3. The process of claim 1 wherein the pellets are raised to said temperature without sizing.

4. The process of claim 1 wherein at least 25 percent of said pellets are exploded.

5. The process of claim 1 wherein said temperature is between about 1950° and 2125° F.

6. The process of claim 1 wherein said process is continuous and the heating step is completed for an average particle in less than about 50 minutes.

7. The process of claim 1 wherein the heating regimen consists essentially of said step of heating at a rate sufficient to explode at least some of said pellets.

8. A process for converting waste dust from a basic oxygen steelmaking process into valuable material suitable for recycling to a refining process comprising the steps of pelletizing said dust, heating the resulting pelletized dust in the presence of a material capable of reducing oxides to a temperature between about 1900° and 2200° F. and at a rate sufficient to explode at least some of said pellets, removing a substantially zinc free sinter feed material of plus eight mesh and minus ¼" from said chamber, water quenching the sinter and recycling it to said steelmaking process.

* * * * *